US011526930B2

(12) United States Patent
Yadav et al.

(10) Patent No.: US 11,526,930 B2
(45) Date of Patent: Dec. 13, 2022

(54) OPTIMIZATION OF ORDER FULFILLMENT CONDITIONS

(71) Applicant: International Business Machines Corporation, Armonk, NY (US)

(72) Inventors: Saurabh Yadav, Bangalore (IN); Shikhar Kwatra, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 15 days.

(21) Appl. No.: 17/028,454

(22) Filed: Sep. 22, 2020

(65) Prior Publication Data

US 2022/0092677 A1     Mar. 24, 2022

(51) Int. Cl.
*G06Q 10/00*     (2012.01)
*G06Q 30/06*     (2012.01)
(Continued)

(52) U.S. Cl.
CPC ..... *G06Q 30/0635* (2013.01); *G01C 21/3407* (2013.01); *G01C 21/3453* (2013.01);
(Continued)

(58) Field of Classification Search
None
See application file for complete search history.

(56) References Cited

U.S. PATENT DOCUMENTS

| 7,561,069 B2 | 7/2009 | Horstemeyer |
| 7,974,873 B2 | 7/2011 | Simmons |

(Continued)

FOREIGN PATENT DOCUMENTS

| CN | 107134076 A | 9/2017 |
| CN | 111105181 A | 5/2020 |
| WO | 2021045935 A1 | 3/2021 |

OTHER PUBLICATIONS

Naduad, Julien, Is Blockchain Still Relevant for Order-to-Cash and Procure-to-Pay, Aug. 7, 2020, Corcentric, https://www.corcentric.com/blog/is-blockchain-still-relevant-for-order-to-cash-and-procure-to-pay/, p. 1-9. (Year: 2020).*

(Continued)

*Primary Examiner* — Joseph M Waesco
(74) *Attorney, Agent, or Firm* — David K. Mattheis; Maeve Carpenter

(57) ABSTRACT

Embodiments include a method for optimizing order fulfillment conditions. Information of an order fulfillment is received, including items included in an order, inventory information of the items included in an order from one or more entities at respective locations, and timeline information of a user associated with the order fulfillment information. A selection of an entity at a first location is determined from the one or more entities at respective locations, and a time schedule associated with the order fulfillment is determined. Conditions are determined that correspond to the entity at the first location and a travel route to the first location, and responsive to determining the conditions corresponding to the travel route and the first location of the entity to be unfavorable for the order fulfillment, a modification is performed on the information of the order fulfillment resulting in favorable conditions for the order fulfillment.

17 Claims, 3 Drawing Sheets

(51) Int. Cl.
*G06Q 10/08* (2012.01)
*G06Q 10/06* (2012.01)
*G06Q 10/10* (2012.01)
*G01W 1/10* (2006.01)
*G06F 16/29* (2019.01)
*G06F 16/27* (2019.01)
*G01C 21/34* (2006.01)

(52) U.S. Cl.
CPC ............... *G01W 1/10* (2013.01); *G06F 16/27* (2019.01); *G06F 16/29* (2019.01); *G06Q 10/06312* (2013.01); *G06Q 10/0836* (2013.01); *G06Q 10/0875* (2013.01); *G06Q 10/1097* (2013.01); *G06Q 30/0639* (2013.01)

(56) References Cited

U.S. PATENT DOCUMENTS

| | | | |
|---|---|---|---|
| 8,284,076 B1 | 10/2012 | Horstemeyer | |
| 9,019,130 B2 | 4/2015 | Horstemeyer | |
| 2015/0120364 A1 | 4/2015 | Deshpande | |
| 2016/0350837 A1* | 12/2016 | Williams | G06Q 50/12 |
| 2017/0024804 A1* | 1/2017 | Tepfenhart, Jr. | G06Q 30/0635 |
| 2017/0109673 A1* | 4/2017 | Bell | G06Q 10/06313 |
| 2017/0337509 A1* | 11/2017 | Veras-Nunez | G06Q 10/087 |
| 2018/0053149 A1* | 2/2018 | Sarrapy | G06Q 10/0834 |
| 2018/0060943 A1* | 3/2018 | Mattingly | G06Q 20/12 |
| 2019/0180231 A1* | 6/2019 | Phillips | G06Q 10/087 |
| 2019/0180236 A1* | 6/2019 | Greenberger | G05D 1/0291 |
| 2019/0182055 A1* | 6/2019 | Christidis | H04L 63/12 |
| 2019/0295034 A1* | 9/2019 | Wenzel | G06Q 10/08355 |
| 2019/0317935 A1* | 10/2019 | Berti | G06F 16/27 |
| 2020/0065761 A1* | 2/2020 | Tatchell | G06Q 40/025 |
| 2020/0211000 A1* | 7/2020 | Narasimhan | G06Q 20/3678 |
| 2020/0242547 A1* | 7/2020 | Chappell | G06Q 30/0631 |

OTHER PUBLICATIONS

"Cognitively Assisting Pick-Up Scheduling for a Product", IP.com No. IPCOM000254867D, IP.com Electronic Publication Date: Aug. 9, 2018, 5 pps., <https://priorart.ip.com/IPCOM/000254867>.

Gannon, "BOPIS: How Buy Online, Pick-Up in Store is Catering to Consumer's Needs and Boosting Retailer's Bottom Line", © Copyright 2003-2020 BigCommerce Pty. Ltd., 9 pps., <https://www.bigcommerce.com/blog/bopis/#what-is-bopis >.

Ewald, "Stronger Together: BOPIS and AI-powered Personalization", 5 pps., Jun. 17, 2019, <https://reflektion.com/now-trending-bopis/>.

Pawar, "Optimize supply-chain routes to ensure on-time deliveries by predicting potential weather events", IBM Developer Blog, 6 pps., Mar. 13, 2020, <https://developer.ibm.com/blogs/sci-the-weather-company/>.

Santoro, "The Retailer's Guide to Google Local Inventory", 12 pps., Mar. 15, 2018, Google, <https://www.godatafeed.com/blog/google-local-inventory>.

International Search Report and Written Opinion dated Dec. 16, 2021 from PCT Application No. PCT/CN2021/119352.

* cited by examiner

OPTIMIZATION OF ORDER FULFILLMENT CONDITIONS

FIELD OF THE INVENTION

The present invention relates generally to the field of scheduling convenience, and more particularly to automatic changing of location, time, or method of a scheduled pickup due to location conditions.

BACKGROUND OF THE INVENTION

Consumers and businesses have shown an increasing tendency to place orders of items or services online and schedule the subsequent pickup or delivery. Online ordering offers the convenience of confirmed inventory availability, preference of pickup or delivery, and selection of location for order fulfillment. Order fulfillment includes placing an order of items or services with an entity and scheduling pickup or delivery at the location of the selected entity. An order pickup or delivery can be scheduled with an entity, which can be a retail store, a restaurant or food provider, a service provider, or a distribution facility, among other possibilities. Performing order fulfillment at an entity includes a travel route to the selected entity location.

SUMMARY

Embodiments of the present invention disclose a method, computer program product, and system. The embodiments include a method for optimizing order fulfillment conditions. The method provides for one or more processors to receive information of an order fulfillment including items included in an order, inventory information of the items included in an order from one or more entities at respective locations, and timeline information of a user associated with the order fulfillment information. The one or more processors determine a selection of an entity at a first location from the one or more entities at respective locations and a time schedule associated with the order fulfillment. The one or more processors determine conditions corresponding to the entity at the first location and a travel route to the first location, and responsive to determining the conditions corresponding to the travel route and the first location of the entity to be unfavorable for the order fulfillment, the one or more processors perform a modification to the information of the order fulfillment resulting in favorable conditions for the order fulfillment.

DETAILED DESCRIPTION

Figure 1:
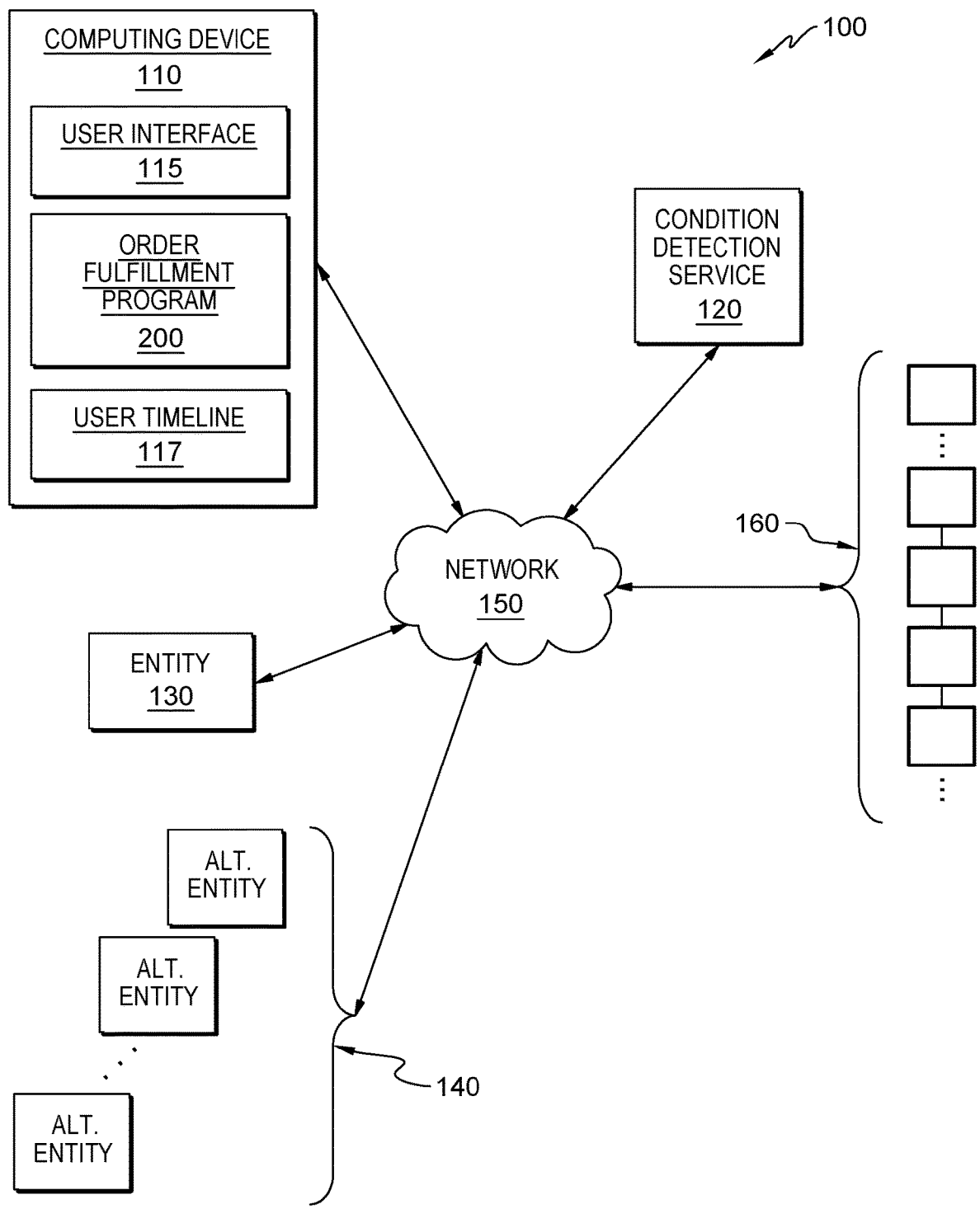
FIG. 1 is a functional block diagram illustrating a distributed data processing environment, in accordance with an embodiment of the present invention.

Embodiments of the present invention recognize scenarios involving order fulfillment of an order placed or received online with an intent to pickup or deliver the order at a location of a selected entity, and at a scheduled time, by a travel route. In some embodiments, the order can be to a supplier or distribution facility and the order is scheduled for delivery to the ordering entity at a scheduled time. In other embodiments, an order is placed by a user to an entity with an inventory indicating the availability of items included as the content of the order. The order fulfillment includes a scheduled time at which the user plans to pick up the order at the location of the selected entity, by taking a travel route to the selected entity's location.

Embodiments also recognize that in some instances, conditions may exist at or around the time of the planned pickup or delivery of the order, which may inconvenience, risk, or prevent performing the order fulfillment of pickup or delivery. In some embodiments of the present invention, the predicted weather at the location of the selected entity and at the scheduled time for order fulfillment may be unfavorable for the user. Similarly, delivery of an order may find the predicted weather to be unfavorable at or around the entity location at the scheduled time of the delivery.

In some embodiments, conditions associated with the pickup location or delivery location and/or the travel route to the respective locations may include other unfavorable circumstances that prevent, risk, or inconvenience performing the order fulfillment, such as traffic issues, emergency situations, and unanticipated entity inventory changes, among others.

Embodiments of the present invention provide a method, computer program product, and computer system to perform modification of order fulfillment information in response to determining conditions at a location of a selected entity are unfavorable to complete order fulfillment. In some embodiments, an Artificial Intelligence (AI) system that accesses and interprets predicted weather or other conditions associated with the travel route and location of the selected entity for order pickup or delivery and dynamically proposes to the customer options to change the entity location/method of order fulfillment, or scheduling of order fulfillment, if the conditions at the original entity location are unfavorable. The AI system shares the information in a duplex form with custom s and local entities in a network-based blockchain ledger.

Embodiments of the present invention consider both order pickup and order delivery as components of order fulfillment. Embodiments include consideration of the items included in the order placed, the inventory of the primary entity associated with the order fulfillment as well as the inventory of alternate entities located within a practical travel range of the primary entity and to a user performing the order fulfillment. Embodiments also consider the predicted weather conditions and other conditions associated with the location of the entity selected for order fulfillment and conditions associated with travel to and from the entity location.

In some embodiments, in response to determining that conditions associated with the order fulfillment scheduled at the selected entity are unfavorable, embodiments of the present invention can dynamically perform a modification of order fulfillment parameters, based on information of the user's timeline (time schedule), inventory information of the selected and alternate entities, and predicted weather conditions and other conditions associated with the selected and alternate entities, and travel routes to and from the selected and alternate entities. The dynamically performed modifications to the order fulfillment include at least one of changing the selected entity to an alternate entity at a different location not affected by the unfavorable conditions, change the scheduling of the order fulfillment based on analysis of the user's timeline information and predictive conditions, change the order to a "ship to home" option, or cancelation of the order.

The present invention will now be described in detail with reference to the Figures. FIG. 1 is a functional block diagram illustrating a distributed data processing environment, generally designated 100, in accordance with an embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes computing device 110, condition detection service 120, selected entity 130, alternate entities 140, and network-based blockchain ledger 160, all interconnected via network 150. Network 150 can be, for example, a local area network (LAN), a wide area network (WAN), such as the Internet, a virtual local area network (VLAN), or any combination that can include wired, wireless, or optical connections. In general, network 150 can be any combination of connections and protocols that will support communication and data transmission between computing device 110, condition detection service 120, selected entity 130, alternate entities 140, and network-based blockchain ledger 160.

Computing device 110 includes user interface 115, user timeline 117, and order fulfillment program 200. In some embodiments, computing device 110 is a standalone mobile computing device, a smartphone, a tablet computer, a smartwatch, a laptop computer, or other electronic device or computing system capable of receiving, sending, and processing data. In other embodiments, computing device 110 may be a computing device interacting with applications and services hosted and operating in a cloud computing environment. In another embodiment, computing device 110 can be a netbook computer, a desktop computer, a personal digital assistant (PDA), or another programmable electronic device capable of generating and transmitting input to and receiving programming instructions from order fulfillment program 200 hosted on computing device 110. Alternatively, in some embodiments, computing device 110 may be communicatively connected to order fulfillment program 200 operating remotely. Computing device 110 may include internal and external hardware components, depicted in more detail in FIG. 3.

User interface 115 provides an interface to access features and functions of computing device 110. In some embodiments of the present invention, user interface 115 provides access to order fulfillment program 200 operating on computing device 110. User interface 115 also supports access to other applications, features, and functions of computing device 110 (not shown). User interface 115 displays the content exchanged between a user of computing device 110 and other computing devices, sending and receiving data. In some embodiments, user interface 115 displays images, text, and other information and receives input from a user of computing device 110.

User interface 115 supports access to alerts, notifications, and provides forms of communications. In one embodiment, user interface 115 may be a graphical user interface (GUI) or web user interface (WUI) and can receive user input and display text, documents, web browser windows, user options, application interfaces, and instructions for operation, and include the information (such as graphic, text, and sound) that a program presents to a user and the control sequences the user employs to control the program. In another embodiment, user interface 115 may also include mobile application software that provides respective interfaces to features and functions of computing device 110. User interface 115 enables a user of computing device 110 to receive, view, hear, and respond to input, access applications, display content of online conversational exchanges, and perform available functions.

User timeline 117 includes schedule information of the user of computing device 110 associated with the order fulfillment. User timeline 117 includes time ranges in which the user of computing device 110 is unavailable due to planned or scheduled activities or interactions with other users. User timeline 117 also includes time ranges in which the user of computing device 110 is available for other activities. In embodiments of the present invention, user timeline 117 includes a scheduled date and time at which the user of computing device 110 plans on performing an order fulfillment of an order previously placed at selected entity 130.

Order fulfillment program 200 is depicted as operating on computing device 110. Order fulfillment program 200 includes artificial intelligence capability to receive input regarding an order that is placed and associated with a selected entity, such as a store, business, restaurant, or the like, and receive known or predicted condition information associated with the selected entity location and travel routes to and from the entity. Order fulfillment program 200 determines whether conditions associated with the order fulfillment are favorable or unfavorable, based on learning weather, travel conditions, inventory, and other entity conditions associated with unfavorable conditions. Unfavorable conditions may include pre-determined or known weather conditions such as icy conditions, snow accumulations, thunderstorms, or other weather conditions that may create risky or inconvenient situations for the user. Unfavorable conditions may be further defined by user input, such as traffic conditions on travel routes, or changes to entity inventory.

Order fulfillment program 200 performs a modification of order fulfillment information in response to determining conditions at a location of a selected entity that is unfavorable to complete the order fulfillment. In some embodiments, weather forecasts and other conditions may be received from applications (apps) reporting on conditions or services, such as condition detection service 120. Based on the received condition information received from condition detection service 120 and determining the conditions for the order fulfillment is unfavorable, order fulfillment program 200 performs a modification of the parameters of the order fulfillment. Order fulfillment program 200 considers the favorability of weather conditions at the selected entity location, as well as weather conditions associated with the travel route to and from the entity location at the scheduled time of order fulfillment. In some embodiments, order fulfillment program 200 considers other conditions that may affect the travel route to the selected entity location, as well as conditions and circumstances made known at the selected entity. Order fulfillment program 200 improves the favorability of the order fulfillment by performing one or more modifications of the parameters and information associated with the order.

For example, order fulfillment program 200 receives, from condition detection service 120, a predicted weather forecast for the selected entity location indicating very unfavorable travel conditions, such as icy roads, significant snow accumulations, dangerous thunderstorms, or expected rainfall that would make order fulfillment at the scheduled time and location of the selected entity risky or inconvenient. Order fulfillment program 200 considers modifications to the parameters of the planned order fulfillment and provides an optimum change to reduce or eliminate the risk or inconvenience of the order fulfillment. In some embodiments, order fulfillment program 200 considers information regarding conditions of the travel route to the selected entity location that may produce unfavorable conditions, such as heavy traffic or impeded or closed roadways. In other embodiments, order fulfillment program 200 considers conditions at the selected entity such as emergency conditions or unanticipated changes to inventory that indicates items included in the content of the order are no longer available.

In one embodiment, responding to determining an unfavorable condition associated with the planned order fulfillment, order fulfillment program 200 checks the inventory of alternate entities within a pre-determined travel radius of the user scheduling the order fulfillment and changes the order to an alternate entity that does not experience unfavorable conditions. In another embodiment, order fulfillment program 200 modifies the order fulfillment parameters by rescheduling the order fulfillment at another time, consistent with timeline 117 of the user of computing device 110, and consistent with more favorable predicted weather conditions and other known or anticipated conditions. In yet another embodiment, order fulfillment program 200 performs modifications to the order fulfillment parameters by changing the order to a "deliver to home" order, if available, avoiding travel to and from the selected entity location by the user that has placed the order. In still another embodiment, the user may change the parameters of the order fulfillment by canceling the order fulfillment.

Order fulfillment program 200 dynamically proposes options to change the entity location, change the method of order fulfillment, re-schedule the order fulfillment, or cancel the order fulfillment if order fulfillment program 200 determines the conditions at the original entity location are unfavorable. Order fulfillment program 200 shares the information in a duplex form with customers and local entities by posting at least some of the order fulfillment parameters in a blockchain ledger, such as network-based blockchain ledger 160. By adding order fulfillment parameters to network-based blockchain ledger 160, order fulfillment program 200 creates an immutable record of order fulfillment information that is shared and available to the user and the entities involved.

Condition detection service 120 represents one or more sources of condition information available via network 150 and received by order fulfillment program 200. Condition detection service 120 includes predicted weather conditions for a designated area that includes the location of the user of computing device 110 and the locations of selected entity 130 and locations of alternate entities 140. In some embodiments, condition detection service 120 continually updates weather predictions for the location of selected entity 130 and alternate entities 140. In some embodiments, condition detection service 120 includes available condition information for traffic flow, construction, and impeded roadways associated with travel routes to and from selected entity 130. In some embodiments, condition detection service 120 also includes condition information associated with selected entity 130 and alternate entities 140, providing information regarding inventory levels at respective entities, and possible emergency or other conditions that may make order fulfillment risky or inconvenient. For example, condition detection service 120 may include information regarding fire, a civil disturbance, or law enforcement involvement at selected entity 130.

Selected entity 130 is a location at which the planned order fulfillment is scheduled to occur. In some embodiments of the present invention, selected entity 130 may be one of retail business building, a distribution center, a restaurant or food service, or a meeting location associated with an order fulfillment of an order of items or services. In some embodiments, the selected entity includes online inventory information which is reviewed by a user in placing the order for order fulfillment. Selected entity 130 may include an e-commerce website or mobile app enabling a user to participate in a buy-online, pickup-in-store (BOPIS) scenario. Selected entity 130 provides a scheduled pickup time and location for the order, consistent with user timeline 117. In some embodiments, selected entity 130 may be a recipient of delivery of items at a scheduled time and at the location of selected entity 130.

Alternate entities 140 represents additional entities located within a pre-determined distance from the user's location that include searchable inventory offering the user a selection of entities to choose from in placing an order. Respective entities of alternate entities 140 include travel routes to and from the respective entities that differ from travel routes to and from selected entity 130. Respective entities of alternate entities 140 are enabled to receive information associated with changing of the order fulfillment from selected entity 130 to one of the respective alternate entities 140 having inventory that includes items matching contents of the order placed by the user.

Network-based blockchain ledger 160 includes an immutable record of order fulfillment parameters of orders and/or deliveries planned by the user of computing device 110. The hashed order fulfillment parameter information of network-based blockchain ledger 160 is accessible to the user and to the entities associated with the order fulfillment. The order fulfillment information added to a blockchain ledger node includes information associated with the user placing the order, the selected entity and location for order fulfillment, the items included in as the contents of the order, the scheduled timeframe of order fulfillment, and predicted weather conditions for the location and time schedule of the order fulfillment. In some embodiments, the weather conditions are continuously monitored, and predictions are updated and added to a corresponding node of network-based blockchain ledger 160. In response to changes to the parameters of the order fulfillment, the blockchain node of network-based blockchain ledger 160 is updated in accordance with options presented to the user by order fulfillment program 200 and selected by the user, including changes to the entity and location selected, changes to the scheduled time, changes to the method of order fulfillment (i.e., "deliver to home"), and cancelation of the order.

Figure 2:
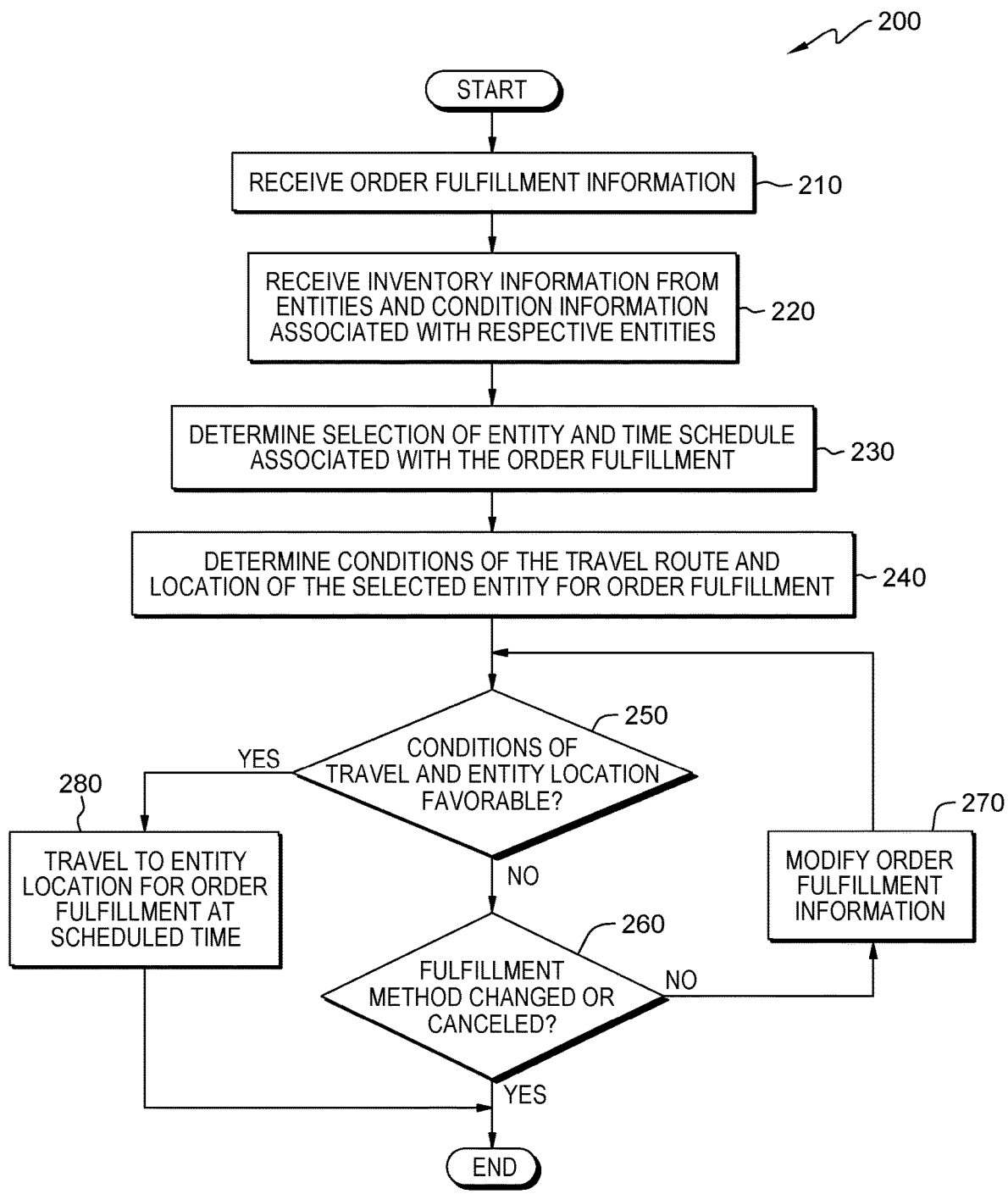
FIG. 2 is a flowchart depicting the operational steps of an order fulfillment program operating in the distributed data processing environment of FIG. 1, in accordance with embodiments of the present invention.

FIG. 2 is a flowchart depicting operational steps of order fulfillment program 200, operating in distributed data processing environment 100 of FIG. 1, in accordance with embodiments of the present invention. Embodiments of the present invention apply to orders placed for user pickup, and for orders placed for delivery, such as from a distribution center to a retail business location. For clarity and simplicity, the features and inventive concepts of the embodiments of the present invention, which are discussed with respect to FIG. 2, will be presented with respect to a scheduled pickup of an order placed to a selected entity. In embodiments of the present invention, entities include locations of businesses, organizations, and service providers at designated locations at which the placed order is scheduled for pickup. In some embodiments, the order fulfillment includes the information and activity resulting in conditions enabling a successful pickup of a placed order or cancelation of the order.

In an embodiment of the present invention, a user of computing device 110, hosting order fulfillment program 200, performs an online search for a set of items at one or more entities, such as retail stores that have searchable inventories. The user selects an entity and places an online order indicating a "pickup-at-store" method of order fulfillment, indicating a selected scheduled time for the pickup.

Order fulfillment program 200 receives order fulfillment information (step 210). The information received by order fulfillment program 200 includes parameters associated with the order placed by the user, such as a listing of alternate entities and the selected entity to which the order was placed, the location of the respective entities, the items ordered, the time scheduled of the user, and in some embodiments, includes information of travel routes between the user's location and the respective entity locations.

For example, the user of computing device 110 performs online searches for entities for items to include in an order. The search returns information including a listing of entities that may offer the items the user intends to order. Order fulfillment program 200 receives information that includes the entities (selected entity 130 and alternate entities 140), the respective locations of the entities, the items the user intends to order, and information from timeline 117 that includes the user's schedule of available time.

Order fulfillment program 200 receives inventory information and condition information associated with respective entities (step 220). Order fulfillment program 200 accesses and receives information regarding the availability of items included on the intended order from the respective inventory of the entities located within a pre-determined radius of the location of the user placing the order. In some embodiments, order fulfillment program 200 uses the received information to determine a list of entities that include the intended order items in inventory. Additionally, order fulfillment program 200 receives condition information associated with the respective entities, which includes weather predictions for the vicinity of each entity, condition information about travel routes to the respective entities from the user's location, and potentially known conditions of the respective entity. In some embodiments, the condition information is received from apps communicatively connected to order fulfillment program 200, such as a weather app, a traffic app, a news app, or a community awareness notification app.

For example, order fulfillment program 200 receives inventory information from alternate entities 140 and selected entity 130. Order fulfillment program 200 receives weather predictions and traffic condition information for each of the respective entity locations from condition detection service 120. In some embodiments, condition detection service 120 includes information regarding the specific location and structures of the respective entities.

Order fulfillment program 200 determines a selection of entity and time schedule associated with the order fulfillment (step 230). Order fulfillment program 200 receives information indicating the entity selected by the user at which the order is placed, and pick up is scheduled. Order fulfillment program 200 receives the time schedule of the pickup, consistent with the user's stored schedule information and has the location of the selected entity, which has been previously received.

For example, order fulfillment program 200 determines that the user has chosen selected entity 130 from the listing of entities with items intended to order that includes alternate entities 140. Additionally, order fulfillment program 200 receives the scheduled pickup time information associated with the order fulfillment and has location information of selected entity 130, which has been previously received.

Order fulfillment program 200 determines the conditions of the travel route and location of the selected entity for order fulfillment (step 240). Having received the selected entity information, order fulfillment program 200 determines the conditions associated with the travel route and location of the selected entity. Order fulfillment program 200 receives weather predictions and travel route condition information from available apps communicatively connected to computing device 110. In some embodiments, order fulfillment program 200 receives information regarding conditions at the selected entity site. Order fulfillment program 200 aligns the weather, travel route, and entity location conditions with the scheduled pickup time information to determine aggregate conditions coinciding with the planned schedule of order pickup.

For example, order fulfillment program 200 includes weather predictions and traffic condition information received from condition detection service 120. Order fulfillment program 200 considers the predicted weather conditions and travel route traffic conditions for the scheduled pickup time of the order.

Order fulfillment program 200 determines whether conditions associated with travel routes and the entity location are favorable (decision step 250). Order fulfillment program 200 considers the weather predictions for the travel route and selected entity at the scheduled time of order pickup, as well as the known or anticipated traffic conditions of the travel route and additional condition information provided about the selected entity location. Based on the received condition information and previous training of sets of conditions considered favorable and unfavorable, order fulfillment program 200 determines whether the conditions associated with the travel and location of the order pickup are favorable.

For the case in which order fulfillment program 200 determines that the conditions of the travel route and at the selected entity location are favorable (step 250, "YES" branch), order fulfillment program 200 proceeds to instruct the user associated with the order fulfillment to travel to the selected entity location for order fulfillment at the scheduled time (step 280). Having completed order fulfillment at the selected entity and picking up the order at the scheduled time, order fulfillment program 200 ends.

For the case in which order fulfillment program 200 determines that conditions of the travel route and at the entity location are unfavorable (step 270, "NO" branch), order fulfillment program 200 determines whether the order fulfillment method is changed or whether the order fulfillment is canceled by the user (decision step 260). Order fulfillment program 200 determines unfavorable conditions based on weather predictions associated with the location of the selected entity and the travel route to the selected entity. Additionally, traffic conditions of the travel route and other conditions associated with the selected entity site are considered in determining unfavorable conditions.

For example, a pre-determined amount of snow accumulation may trigger order fulfillment program 200 to determine an unfavorable condition, as well as predicted weather of thunderstorms, heavy rain, icy roads, power outage, traffic impediments, or other conditions that may result in dangerous, risky, or inconvenient circumstances for the user to attempt order pickup at the selected entity. In some embodiments of the present invention, order fulfillment program 200 is trained to determine favorable and unfavorable conditions based on learning from user actions, given a set of conditions. In other embodiments, order fulfillment program 200 is trained by supervised learning techniques and modified by user input over time.

Order fulfillment program 200 determines whether the method of order fulfillment is changed or is canceled (decision step 260). Having determined unfavorable conditions exist at the location of the selected entity or the travel route to the selected entity for order pickup, order fulfillment program 200 determines whether an option to change the method of order fulfillment or cancel the order has been made. For the case in which order fulfillment program 200 determines that an order fulfillment method change or an order cancelation has been made (step 260, "YES" branch), order fulfillment program 200 takes no further action and ends.

In some embodiments of the present invention, order fulfillment program 200 determines that an option changing the method of order fulfillment is present and includes changing a "pickup-in-store" option to a "ship-to-home" option, and avoids travel to the selected entity location during unfavorable conditions. In some embodiments, an option to cancel the order is determined and order fulfillment program 200 takes no further action and ends.

For the case in which order fulfillment program 200 determines that the order fulfillment method has not changed, and the order has not been canceled (step 260, "NO" branch), order fulfillment program 200 modifies the order fulfillment information (step 270). Order fulfillment program 200 modifies the parameters of the order fulfillment to provide favorable conditions for order fulfillment. In some embodiments of the present invention, order fulfillment program 200 determines whether an option to change the placement of the order to an alternate entity at a location having favorable conditions. Order fulfillment program 200 determines the alternate entities offering inventory available matching the item contents of the previously placed order and selects an alternate entity having adequate inventory and proceeds to step 250 to determine whether conditions are favorable at the alternate entity, and proceeds as described above.

In other embodiments, order fulfillment program 200 determines that favorable conditions will exist at a later time, and checking the information in user timeline 117, order fulfillment program 200 modifies the parameters of the order fulfillment to schedule the order pickup at the selected entity at a later scheduled time, consistent with availability as indicated from user timeline 117. Order fulfillment program 200 automatically updates the order fulfillment information with the selected entity and alternate entities consistent with the determination of favorable conditions, and updates network-based blockchain ledger 160 with the updated information. In some embodiments, order fulfillment program 200 appends the updated order fulfillment information to the node information of the blockchain ledger as additional metadata attributes of the order fulfillment. In some embodiments, notifications including modifications made to the order fulfillment are sent to the entities involved and the user that placed the order.

Having modified the parameters of the order fulfillment to favorable conditions, order fulfillment program 200 proceeds to step 280, completes the order fulfillment, and ends.

Figure 3:
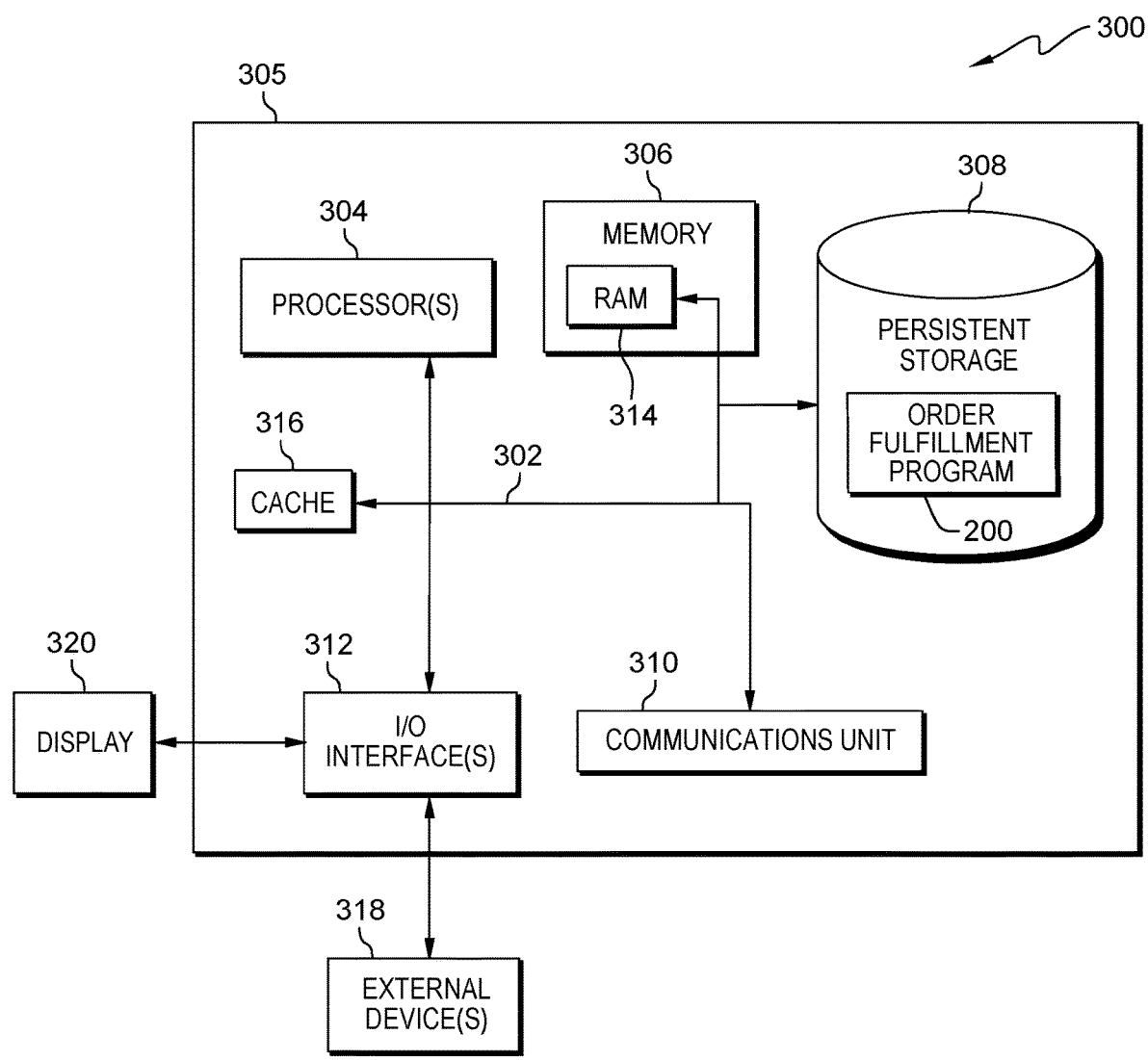
FIG. 3 depicts a block diagram of components of a computing system, including a computing device configured to operationally perform the order fulfillment program of FIG. 3, in accordance with an embodiment of the present invention.

FIG. 3 depicts a block diagram of components of a computing system, including computing device 305, configured to include or operationally connect to components depicted in FIG. 1, and with the capability to operationally perform order fulfillment program 200 of FIG. 3, in accordance with an embodiment of the present invention.

Computing device 305 includes components and functional capability similar to components of server 120, (FIG. 1), in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Computing device 305 includes communications fabric 302, which provides communications between computer processor(s) 304, memory 306, persistent storage 308, communications unit 310, an input/output (I/O) interface(s) 312. Communications fabric 302 can be implemented with any architecture designed for passing data and/or control information between processors (such as microprocessors, communications, and network processors, etc.), system memory, peripheral devices, and any other hardware components within a system. For example, communications fabric 302 can be implemented with one or more buses.

Memory 306, cache memory 316, and persistent storage 308 are computer-readable storage media. In this embodiment, memory 306 includes random access memory (RAM) 314. In general, memory 306 can include any suitable volatile or non-volatile computer-readable storage media.

In one embodiment, order fulfillment program 200 is stored in persistent storage 308 for execution by one or more of the respective computer processors 304 via one or more memories of memory 306. In this embodiment, persistent storage 308 includes a magnetic hard disk drive. Alternatively, or in addition to a magnetic hard disk drive, persistent storage 308 can include a solid-state hard drive, a semiconductor storage device, read-only memory (ROM), erasable programmable read-only memory (EPROM), flash memory, or any other computer-readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer-readable storage medium that is also part of persistent storage 308.

Communications unit 310, in these examples, provides for communications with other data processing systems or devices, including resources of distributed data processing environment 100. In these examples, communications unit 310 includes one or more network interface cards. Communications unit 310 may provide communications through the use of either or both physical and wireless communications links. Order fulfillment program 200 may be downloaded to persistent storage 308 through communications unit 310.

I/O interface(s) 312 allows for input and output of data with other devices that may be connected to computing system 300. For example, I/O interface 312 may provide a connection to external devices 318 such as a keyboard, keypad, a touch screen, and/or some other suitable input device. External devices 318 can also include portable computer-readable storage media such as, for example, thumb drives, portable optical or magnetic disks, and memory cards. Software and data used to practice embodiments of the present invention, e.g., order fulfillment program 200 can be stored on such portable computer-readable storage media and can be loaded onto persistent storage 308 via I/O interface(s) 312. I/O interface(s) 312 also connects to a display 320.

Display 320 provides a mechanism to display data to a user and may, for example, be a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source code or object code written in any combination of one or more programming languages, including an object-oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer-readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for optimizing order fulfillment conditions, the method comprising:
   receiving, by one or more processors, information associated with fulfillment of an online order including availability of items included in the online order at a plurality of entities and a location of respective entities of the plurality of entities within a predetermined distance, wherein the information is based on results of an online search for the plurality of entities and an online application (app) accessing inventory of the respective entities;
   determining, by the one or more processors, a travel route to the plurality of entities, respectively;
   performing, by the one or more processors, a selection of an entity at a first location and a time schedule for an order fulfillment, based on the information identifying the one or more entities, the availability of the items at the location of the respective entities, conditions along the travel route to the first location, and a time schedule of availability indicated on a computing device of a user associated with the order fulfillment;
   adding, by the one or more processors, the information associated with the order fulfillment to a network-based blockchain ledger accessible to the user and the respective plurality of entities, wherein the added information includes the time schedule, the entity at the first location, the one or more entities not selected, the items included in the order, the travel route to the first location, and known and predicted conditions associated with the entity at the first location;
   determining, by the one or more processors, predicted conditions corresponding to the locations of the plurality of entities and the travel routes to the plurality of entities, respectively, at the time schedule associated with the order fulfillment, based on receiving condition information at the locations by one or more condition update services;
   determining, by the one or more processors, that the predicted conditions corresponding to the entity at the first location and the travel route to the first location at the time schedule of the order fulfillment are unfavorable, based on supervised learning training data identifying favorable and unfavorable conditions; and
   performing, by the one or more processors, a modification to the order fulfillment selection resulting in favorable conditions for the order fulfillment and updating the network-based blockchain ledger accessible to the user and the respective plurality of entities with the modification; and
   displaying, by the one or more processors, the modification to the order fulfillment selection updated in the network-based blockchain ledger, on a user interface of the computing device of the user.

2. The method of claim 1, wherein performing the modification to the selection of the order fulfillment further comprises:
   changing, by the one or more processors, the entity at which the order fulfillment is scheduled to an alternate entity at a second location of the one or more entities at respective locations, at which the conditions are determined to be favorable.

3. The method of claim 1, wherein performing the modification to the selection of the order fulfillment further comprises:
   receiving, by the one or more processors, timeline information of a user associated with the order fulfillment; and
   changing, by the one or more processors, the scheduled time of the order fulfillment at the entity at the first location to a time corresponding to predicted favorable conditions and consistent with the timeline information of the user associated with the order fulfillment.

4. The method of claim 1, wherein performing the modification to the selection of the order fulfillment further comprises:
   changing, by the one or more processors, the method of order fulfillment to a "ship-to-home" method.

5. The method of claim 1, wherein determining the conditions corresponding to the travel route and the first location further comprises:
   determining, by the one or more processors, weather condition predictions corresponding to the travel route and the first location that are unfavorable.

6. The method of claim 1, wherein the determining the conditions at the entity of the first location to be considered unfavorable further comprises:
   receiving, by the one or more processors, inventory information of the items included in the order from the one or more entities at respective locations; and
   determining, by the one or more processors, that one or more of the items included in the order are no longer available from the entity at the first location, based on the inventory information of the items included in the order from the one or more entities at respective locations.

7. The method of claim 1, wherein the one or more entities at the respective locations are within a pre-determined distance of a location of a user associated with the order fulfillment information.

8. A computer system for optimizing order fulfillment conditions, the computer system comprising:
   one or more computer processors;
   one or more computer-readable storage media;
   program instructions stored on the one or more computer-readable storage media, the program instructions comprising:
   program instructions to receive information associated with fulfillment of an online order including availability of items included in the online order at a plurality of entities, including a location of respective entities of the plurality of entities within a predetermined distance, based on results of an online search for the plurality of entities and an online application (app) accessing inventory of the respective entities;
   program instructions to determine a travel route to the plurality of entities, respectively;
   program instructions to perform a selection of an entity at a first location and a time schedule for the order fulfillment, based on the information identifying the one or more entities, the availability of the items at the location of the respective entities, conditions along the travel route to the first location, and a time schedule of availability indicated on a computing device of a user associated with order fulfillment;

program instructions to add the information associated with the order fulfillment to a network-based blockchain ledger accessible to the user and the respective plurality of entities, wherein the added information includes the time schedule, the entity at the first location, the one or more entities not selected, the items included in the order, the travel route to the first location, and known and predicted conditions associated with the entity at the first location;

program instructions to determine predicted conditions corresponding to the locations of the plurality of entities and the travel routes to the plurality of entities, respectively, at the time schedule associated with the order fulfillment, based on receipt of condition information at the locations by one or more condition update services;

program instructions to determine that the predicted conditions corresponding to the entity at the first location and the travel route to the first location at the time schedule of the order fulfillment are unfavorable, based on supervised learning training data identifying favorable and unfavorable conditions;

program instructions to perform a modification to the order fulfillment selection resulting in favorable conditions for the order fulfillment and updating the network-based blockchain ledger accessible to the user and the respective plurality of entities with the modification; and program instructions to display the modification to the order fulfillment selection updated in the network-based blockchain ledger, on a user interface of the computing device of the user.

9. The computer system of claim 8, wherein program instructions to perform the modification to the order fulfillment further comprises:

program instructions to change the entity at which the order fulfillment is scheduled to an alternate entity at a second location at which the conditions are determined to be favorable.

10. The computer system of claim 8, wherein program instructions to perform the modification to the selection of the order fulfillment further comprises:

program instructions to receive timeline information of a user associated with the order fulfillment; and program instructions to change the scheduled time of the order fulfillment at the entity of the first location to a time corresponding to predicted favorable conditions and consistent with a timeline information of a user associated with the order fulfillment.

11. The computer system of claim 8, wherein program instructions to determine the conditions corresponding to the travel route and the first location further comprises:

program instructions to determine weather condition predictions corresponding to the travel route and the first location that are unfavorable.

12. The computer system of claim 8, wherein program instructions to determine the conditions at the entity of the first location to be considered unfavorable further comprises:

program instructions to receive inventory information of the items included in the order from the one or more entities at respective locations; and program instructions to determine that one or more of the items included in the order are no longer available from the entity at the first location, based on the inventory information of the items included in the order from the one or more entities at respective locations.

13. A computer program product for optimizing order fulfillment conditions, the computer program product comprising:

one or more computer-readable storage media;

program instructions stored on the one or more computer-readable storage media, the program instructions comprising:

program instructions to receive information associated with fulfillment of an online order including availability of items included in the online order at a plurality of entities, including a location of respective entities of the plurality of entities within a predetermined distance, based on results of an online search for the plurality of entities and an online application (app) accessing inventory of the respective entities;

program instructions to determine a travel route to the plurality of entities, respectively;

program instructions to perform a selection of an entity at a first location and a time schedule for the order fulfillment, based on the information identifying the one or more entities, the availability of the items at the location of the respective entities, conditions along the travel route to the first location, and a time schedule of availability indicated on a computing device of a user associated with order fulfillment;

program instructions to add the information associated with the order fulfillment to a network-based blockchain ledger accessible to the user and the respective plurality of entities, wherein the added information includes the time schedule, the entity at the first location, the one or more entities not selected, the items included in the order, the travel route to the first location, and known and predicted conditions associated with the entity at the first location;

program instructions to determine predicted conditions corresponding to the locations of the plurality of entities and the travel routes to the plurality of entities, respectively, at the time schedule associated with the order fulfillment, based on receipt of condition information at the locations by one or more condition update services;

program instructions to determine that the predicted conditions corresponding to the entity at the first location and the travel route to the first location at the time schedule of the order fulfillment are unfavorable, based on supervised learning training data identifying favorable and unfavorable conditions;

program instructions to perform a modification to the order fulfillment selection resulting in favorable conditions for the order fulfillment and updating the network-based blockchain ledger accessible to the user and the respective plurality of entities with the modification; and program instructions to display the modification to the order fulfillment selection updated in the network-based blockchain ledger, on a user interface of the computing device of the user.

14. The computer program product of claim 13, wherein program instructions to perform the modification to the order fulfillment selection further comprises:

program instructions to change the entity at which the order fulfillment is scheduled to an alternate entity at a second location at which the conditions are determined to be favorable.

15. The computer program product of claim 13, wherein program instructions to perform the modification to the selection of the order fulfillment further comprises:
 program instructions to receive timeline information of a user associated with the order fulfillment; and
 program instructions to change the scheduled time of the order fulfillment at the entity at the first location to a time corresponding to predicted favorable conditions and consistent with the timeline information of the user.

16. The computer program product of claim 13, wherein program instructions to perform the modification to the selection of the order fulfillment further comprises:
 program instructions to change the method of order fulfillment to a "ship-to-home" method.

17. The computer program product of claim 13, wherein the plurality of entities at the respective locations are within a pre-determined distance of a location of a user associated with the order fulfillment information.

\* \* \* \* \*